United States Patent
Amouzadeh Tabrizi et al.

(10) Patent No.: US 10,576,320 B2
(45) Date of Patent: Mar. 3, 2020

(54) FABRICATION OF NANOMOTORS AND APPLICATIONS THEREOF

(71) Applicants: Mahmoud Amouzadeh Tabrizi, Tehran (IR); Mojtaba Shamsipur, Tehran (IR); Reza Saber, Tehran (IR); Saeed Sarkar, Tehran (IR)

(72) Inventors: Mahmoud Amouzadeh Tabrizi, Tehran (IR); Mojtaba Shamsipur, Tehran (IR); Reza Saber, Tehran (IR); Saeed Sarkar, Tehran (IR)

(*) Notice: Subject to any disclaimer, the term of this patent is extended or adjusted under 35 U.S.C. 154(b) by 227 days.

(21) Appl. No.: 15/866,480

(22) Filed: Jan. 10, 2018

(65) Prior Publication Data

US 2018/0117379 A1    May 3, 2018

Related U.S. Application Data

(60) Provisional application No. 62/457,829, filed on Feb. 11, 2017.

(51) Int. Cl.
| | | |
|---|---|---|
| *A62D 3/38* | (2007.01) | |
| *C25D 1/00* | (2006.01) | |
| *C25D 3/50* | (2006.01) | |
| *C25D 3/12* | (2006.01) | |
| *C25D 3/48* | (2006.01) | |
| *C25D 9/04* | (2006.01) | |
| *B01J 23/89* | (2006.01) | |
| *C25D 5/54* | (2006.01) | |
| *A62D 101/26* | (2007.01) | |
| *B01J 35/02* | (2006.01) | |
| *A62D 101/02* | (2007.01) | |

(52) U.S. Cl.
CPC .............. *A62D 3/38* (2013.01); *B01J 23/892* (2013.01); *C25D 1/006* (2013.01); *C25D 3/12* (2013.01); *C25D 3/48* (2013.01); *C25D 3/50* (2013.01); *C25D 5/54* (2013.01); *C25D 9/04* (2013.01); *A62D 2101/02* (2013.01); *A62D 2101/26* (2013.01); *B01J 35/023* (2013.01)

(58) Field of Classification Search
CPC .. A62D 3/38; A62D 2101/02; A62D 2101/26; B01J 23/892; B01J 35/023; C25D 1/006; C25D 3/12; C25D 3/48; C25D 3/50; C25D 3/54; C25D 9/04
USPC ........................................................ 588/320
See application file for complete search history.

(56) References Cited

U.S. PATENT DOCUMENTS

2013/0084569 A1    4/2013   Wang et al.

OTHER PUBLICATIONS

Aure'lie Goux et al., Prussian Blue electrodeposition within an oriented mesoporous silica film: preliminary observations, J Mater Sci, 2009, pp. 6601-6607, vol. 44.
Timothy R. Kline et al., Catalytic Nanomotors : Remote-Controlled Autonomous Movement of Striped Metallic Nanorods, Angewandte Chemie, 2005, pp. 744-746, vol. 44.
Jahir Orozco et al., Micromotor-Based High-Yielding Fast Oxidative Detoxification of Chemical Threats, Angewandte Chemie, 2013, pp. 13276-13279, vol. 52.

*Primary Examiner* — Edward M Johnson
(74) *Attorney, Agent, or Firm* — Bajwa IP Law Firm; Haris Zaheer Bajwa

(57) ABSTRACT

A method for decontamination of a toxic substance is disclosed. The method includes fabricating a plurality of nanomotors, and putting the plurality of nanomotors in contact with a contaminant solution comprising the toxic substance. Fabricating the plurality of nanomotors includes preparing a mesoporous silica template, forming the plurality of nanomotors within the mesoporous silica template, and separating the plurality of nanomotors from the mesoporous silica template. The mesoporous silica template includes a plurality of channels, where each channel of the plurality of channels have a diameter less than about 50 nm and a length of less than about 100 nm, and each nanomotor of the plurality of nanomotors is formed within a channel of the plurality of channels. Putting the plurality of nanomotors in contact with the contaminant solution includes adding hydrogen peroxide ($H_2O_2$) and the plurality of nanomotors to the contaminant solution.

20 Claims, 24 Drawing Sheets

ABRICATION OF NANOMOTORS AND
APPLICATIONS THEREOF

CROSS-REFERENCE TO RELATED APPLICATION

This application claims the benefit of priority from U.S. Provisional Patent Application Ser. No. 62/457,829 filed on Feb. 11, 2017, and entitled "FABRICATION OF SMALL AND COST-EFFECTIVE NANOROD-SHAPED MOTOR AND APPLICATIONS THEREOF FOR DECONTAMINATION OF PARAOXON-METHYL," which is incorporated herein by reference in its entirety.

SPONSORSHIP STATEMENT

This application has been sponsored by Iran Patent Office, which does not have any rights in this application.

TECHNICAL FIELD

The present disclosure generally relates to nanomotors and a method for fabrication thereof, and particularly, to a method for decontamination of toxic substances using nanomotors.

BACKGROUND

Catalytic nanomotors are nanoscale-manufactured devices which may be propelled by different mechanisms and they have many applications such as drug delivery, surgery, isolation, sensing, environmental remediation and surface writing of microstructure. Up to now, various methods have been utilized for the synthesis of nanomotors. Among these, the template-based nanorod motors have become a favorable method for researchers. However, the perpetrated nanorod shape motors have generally a micrometer scale and most of the used templates are expensive. Therefore, there exists a need for an effective and low-cost template with nanochannels for synthesis of nanorod motors.

Hence, there is a need for effective, and non-expensive methods and templates to fabricate nanomotors in nanometer scales that are applicable for several applications. Also, there is a need for nanomotors in nanometer scales with enhanced properties, and methods using thereof for environmental applications such as degradation of toxic substances.

SUMMARY

This summary is intended to provide an overview of the subject matter of the present disclosure, and is not intended to identify essential elements or key elements of the subject matter, nor is it intended to be used to determine the scope of the claimed implementations. The proper scope of the present disclosure may be ascertained from the claims set forth below in view of the detailed description below and the drawings.

In one general aspect, the present disclosure describes an exemplary method for decontamination of a toxic substance. The method may include fabricating a plurality of nanomotors, and putting the plurality of nanomotors in contact with a contaminant solution comprising the toxic substance. Fabricating the plurality of nanomotors may include preparing a mesoporous silica template, forming the plurality of nanomotors within the mesoporous silica template, and separating the plurality of nanomotors from the mesoporous silica template. The mesoporous silica template may include a plurality of channels, where each channel of the plurality of channels may have a diameter less than about 50 nm and a length of less than about 100 nm, and each nanomotor of the plurality of nanomotors may be formed within a channel of the plurality of channels. Putting the plurality of nanomotors in contact with the contaminant solution may include adding hydrogen peroxide ($H_2O_2$) and the plurality of nanomotors to the contaminant solution. In one exemplary embodiment, the toxic substance may include an organophosphate (OP) nerve agent.

In an exemplary implementation, each nanomotor of the plurality of nanomotors may include a nanorod with a diameter of less than about 50 nm and a length of less than about 100 nm. In one exemplary embodiment, each nanomotor of the plurality of nanomotors may include a nanorod with a diameter of less than about 10 nm and a length of less than about 50 nm.

In an exemplary implementation, the nanorod may include a first segment that may include a metal, and a second segment that may include a magnetic material. In one exemplary embodiment, the metal may include Platinum (Pt), or Palladium (Pd), or combinations thereof. In one exemplary embodiment, the magnetic material may include Nickel (Ni), or Cobalt (Co), or alloys of Ni, or alloys of Co, or combinations thereof.

In an exemplary implementation, the nanorod may further include a third segment that may include Gold (Au). Where, the second segment may be placed between the first segment and the third segment.

In an exemplary implementation, preparing the mesoporous silica template may include forming a mixture of tetraethoxysilane (TEOS) monomer and a surfactant, forming a hydrolyzed silica precursor within the mixture by aging the mixture under stirring at a pH value of 3, and depositing a film of the mesoporous silica template on a graphite electrode. Depositing the film of the mesoporous silica template on the graphite electrode may include immersing the graphite electrode in the mixture, and applying a voltage between about −2.5 V and about −2 V to the mixture. In one exemplary embodiment, the surfactant may include cetyltrimethylammonium bromide (CTAB).

In an exemplary implementation, forming the plurality of nanomotors within the mesoporous silica template may include depositing a sacrificial layer on the mesoporous silica template within each channel of the plurality of channels, depositing a first metal layer on the sacrificial layer, and depositing a second metal layer on the first metal layer. In one exemplary embodiment, the sacrificial layer may include a sacrificial material, which may include Prussian blue (PB) (Iron hexacyanoferrate), or Nickel hexacyanoferrate (NiHCF), or Cobalt hexacyanoferrate (CoHCF), or Copper hexacyanoferrate, or combinations thereof. In one exemplary embodiment, the first metal layer may include Platinum (Pt), or Palladium (Pd), or combinations thereof. In one exemplary embodiment, the second metal layer may include Nickel (Ni), or Cobalt (Co), or alloys of Ni, or alloys of Co, or combinations thereof.

In an exemplary implementation, depositing the sacrificial layer on the mesoporous silica template within each channel of the plurality of channels may include immersing the mesoporous silica template in a solution of the sacrificial material, forming a $N_2$-saturated solution of the sacrificial material by $N_2$ saturating of the solution of the sacrificial material, and applying a voltage between about 0.2 V and about 0.4 V to the $N_2$-saturated solution of the sacrificial material under stirring the $N_2$-saturated solution of the sacrificial material. In an exemplary embodiment, the sacrificial material may include Prussian blue (PB) (Iron hexacyanoferrate), or Nickel hexacyanoferrate (NiHCF), or Cobalt hexacyanoferrate (CoHCF), or Copper hexacyanoferrate, or combinations thereof.

In an exemplary implementation, depositing the first metal layer on the sacrificial layer may include immersing the mesoporous silica template with the sacrificial layer deposited within each channel of the plurality of channels in a first solution of a metal salt of Platinum (Pt), or Palladium (Pd), or combinations thereof, forming a $N_2$-saturated first solution by $N_2$ saturating of the first solution, and applying a voltage between about −0.5V and about −0.4V to the $N_2$-saturated first solution under stirring the $N_2$-saturated first solution.

In an exemplary implementation, depositing the second metal layer on the first metal layer may include immersing the mesoporous silica template with the first metal layer deposited on the sacrificial layer in a second solution of a magnetic material, where the magnetic material may include Nickel (Ni), or Cobalt (Co), or alloys of Ni, or alloys of Co, or combinations thereof, forming a $N_2$-saturated second solution by $N_2$ saturating of the second solution, and applying a voltage between about −1.2 V and about −1 V to the $N_2$-saturated second solution.

In an exemplary implementation, forming the plurality of nanomotors within the mesoporous silica template may further include depositing a third metal layer on the second metal layer, where the third metal layer may include Gold (Au). In one exemplary embodiment, depositing the third metal layer on the second metal layer may include immersing the mesoporous silica template with the second metal layer deposited on the first metal layer in a third solution of Gold (Au), forming a $N_2$-saturated third solution by $N_2$ saturating of the third solution, and applying a voltage between about −0.5 V and about −0.4 V to the $N_2$-saturated third solution.

In an exemplary implementation, separating the plurality of nanomotors from the mesoporous silica template may include immersing the mesoporous silica template containing the plurality of nanomotors in an alkaline solution. In another exemplary implementation, separating the plurality of nanomotors from the mesoporous silica template may include immersing the mesoporous silica template containing the plurality of nanomotors in a solution of Hydrogen Fluoride (HF).

In an exemplary implementation, putting the plurality of nanomotors in contact with the contaminant solution may further include adding an activator agent to the contaminant solution. In one exemplary embodiment, the activator agent may include an alkaline compound.

In an exemplary implementation, putting the plurality of nanomotors in contact with the contaminant solution may further include guiding the plurality of nanomotors by a magnetic field in the contaminant solution.

In another aspect of the present disclosure, a method for fabricating a plurality of nanomotors is disclosed. The method may include preparing a mesoporous silica template including a plurality of channels with a diameter less than about 50 nm and a length of less than about 100 nm, and forming the plurality of nanomotors within the plurality of channels. Forming the plurality of nanomotors within the plurality of channels may include depositing a sacrificial layer including a sacrificial material on the mesoporous silica template within each channel of the plurality of channels, depositing a first metal layer including Platinum (Pt), or Palladium (Pd), or combinations thereof on the sacrificial layer within each channel of the plurality of channels, and depositing a second metal layer including Nickel (Ni), or Cobalt (Co), or alloys of Ni, or alloys of Co, or combinations thereof on the first metal layer within each channel of the plurality of channels. The sacrificial material may include Prussian blue (PB) (Iron hexacyanoferrate), or Nickel hexacyanoferrate (NiHCF), or Cobalt hexacyanoferrate (CoHCF), or Copper hexacyanoferrate, or combinations thereof. The method may further include separating the plurality of nanomotors from the mesoporous silica template and the sacrificial layer.

In an exemplary implementation, forming the plurality of nanomotors within the plurality of channels may further include depositing a third metal layer on the second metal layer within each channel of the plurality of channels. In an exemplary embodiment, the third metal layer may include Gold (Au).

BRIEF DESCRIPTION OF THE DRAWINGS

The drawing figures depict one or more implementations in accord with the present teachings, by way of example only, not by way of limitation. In the figures, like reference numerals refer to the same or similar elements.

DETAILED DESCRIPTION

Figure 1A:
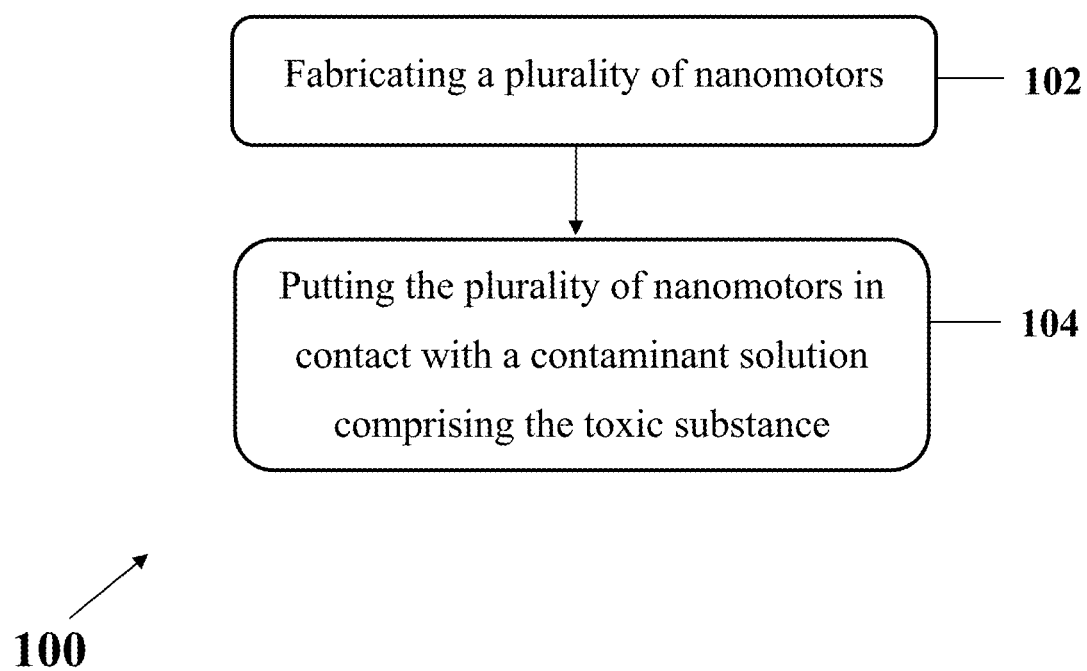
FIG. 1A illustrates a method for decontamination of a toxic substance, consistent with one or more exemplary embodiments of the present disclosure.

In the following detailed description, numerous specific details are set forth by way of examples in order to provide a thorough understanding of the relevant teachings. However, it should be apparent that the present teachings may be practiced without such details. In other instances, well known methods, procedures, components, and/or circuitry have been described at a relatively high-level, without detail, in order to avoid unnecessarily obscuring aspects of the present teachings. The following detailed description is presented to enable a person skilled in the art to make and use the methods and devices disclosed in exemplary embodiments of the present disclosure. For purposes of explanation, specific nomenclature is set forth to provide a thorough understanding of the present disclosure. However, it will be apparent to one skilled in the art that these specific details are not required to practice the disclosed exemplary embodiments. Descriptions of specific exemplary embodiments are provided only as representative examples. Various modifications to the exemplary implementations will be readily apparent to one skilled in the art, and the general principles defined herein may be applied to other implementations and applications without departing from the scope of the present disclosure. The present disclosure is not intended to be limited to the implementations shown, but is to be accorded the widest possible scope consistent with the principles and features disclosed herein.

Catalytic nanomotors are nanoscale-manufactured devices which may be propelled by different mechanisms that convert chemical energy into autonomous motion. Exemplary nanorod motors are effective and may be synthesized at low-costs allowing them to be commercially and technically viable use in several applications, for example, environmental applications. Exemplary nanomotors may be utilized for environmental applications where motion may be induced by different energy sources including light, magnetic, and electric fields, ultrasonic waves, or chemical fuels.

In recent years, an increasing number of terror and military activities in the world has caused extensive pollution of soils and waters due to use of chemical weapons such as paraoxon-methyl (POM), or paraoxon-ethyl (POE) as organophosphate nerve agents. Such components have been scheduled in the "Priority Pollutants List" by the United States Environmental Protection Agency's (USEPA's). Hence, from the environmental and health viewpoints, the development of an effective method for degradation of the organophosphate nerve agents is of significant importance.

Disclosed herein is a simple exemplary method for the perpetration of nanorod shape motors using oriented mesoporous silica films obtained by electro-assisted self-assembly (EASA). The oriented mesoporous silica film may be used as a template for the fabrication of magnetically guided nanomotors. The exemplary fabricated template-based platinum/nickel/gold (Pt—Ni—Au) nanomotors are extremely useful for the decontamination of organophosphate (OP) nerve agents. The proposed nanomotor may be used for the accelerated oxidative detoxification of paraoxon-methyl (POM) as an organophosphate (OP) nerve agent in the presence of hydrogen peroxide ($H_2O_2$) as a fuel of nanomotor and the oxidizing agent.

Herein, an exemplary method for fabricating magnetically-guided nanomotors by using the oriented mesoporous silica films as a template is disclosed. The exemplary method allows for producing nanorod-shaped nanomotors in nanometer scale by electrochemical deposition of metal inside the oriented mesoporous silica film that may be attributed to the presence of a sort of vertical connection of deposition path from conductive substrates. Moreover, an exemplary method for decontamination of a toxic substance using the exemplary nanomotors is disclosed. In an exemplary method, exemplary fabricated nanomotors may be utilized for decontamination of paraoxon-methyl (POM) or paraoxon-ethyl (POE) as organophosphate (OP) nerve agents.

FIG. 1A shows an exemplary method 100 for decontamination of a toxic substance, consistent with exemplary embodiments of the present disclosure. Method 100 may include fabricating a plurality of nanomotors (step 102), and putting the plurality of nanomotors in contact with a contaminant solution including the toxic substance (step 104).

Figure 1B:
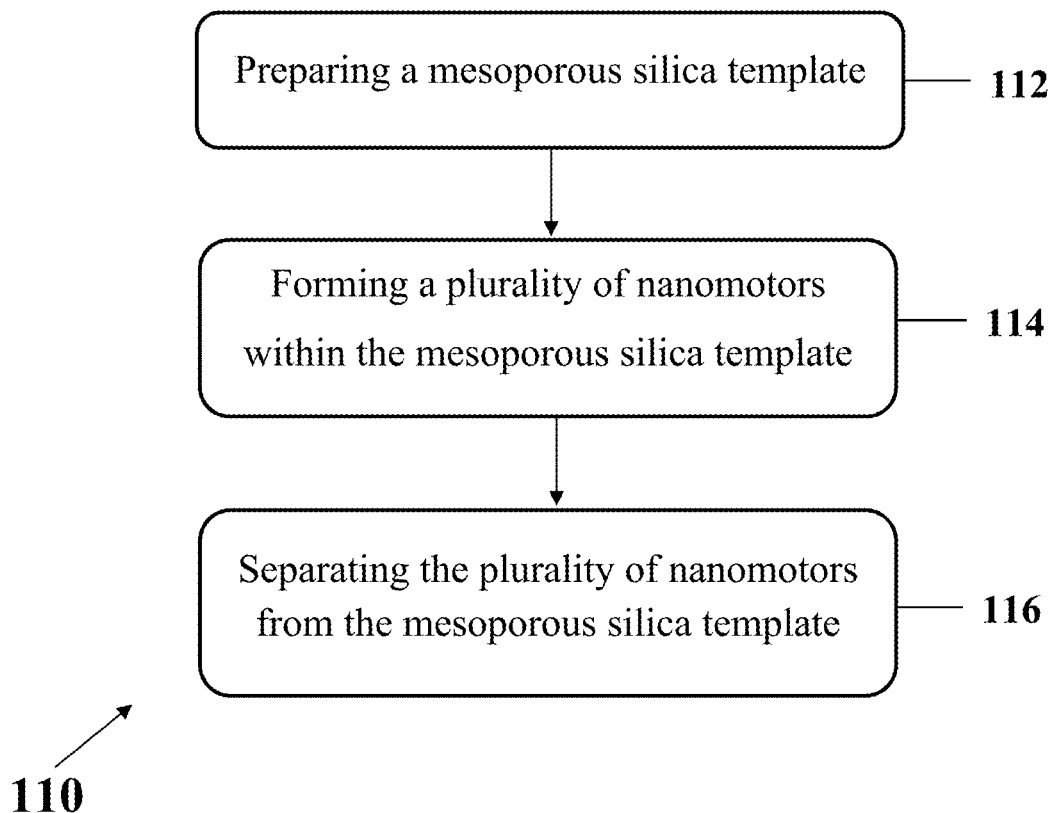
FIG. 1B illustrates a method for fabricating the plurality of nanomotors, consistent with one or more exemplary embodiments of the present disclosure.

Step 102 may include fabricating the plurality of nanomotors. FIG. 1B shows an exemplary method 110 for fabricating the plurality of nanomotors that may include an exemplary implementation of step 102, consistent with exemplary embodiments of the present disclosure. Method 110 may include preparing the mesoporous silica template (step 112), forming the plurality of nanomotors within the mesoporous silica template (step 114), and separating the plurality of nanomotors from the mesoporous silica template (step 116).

Figure 1C:
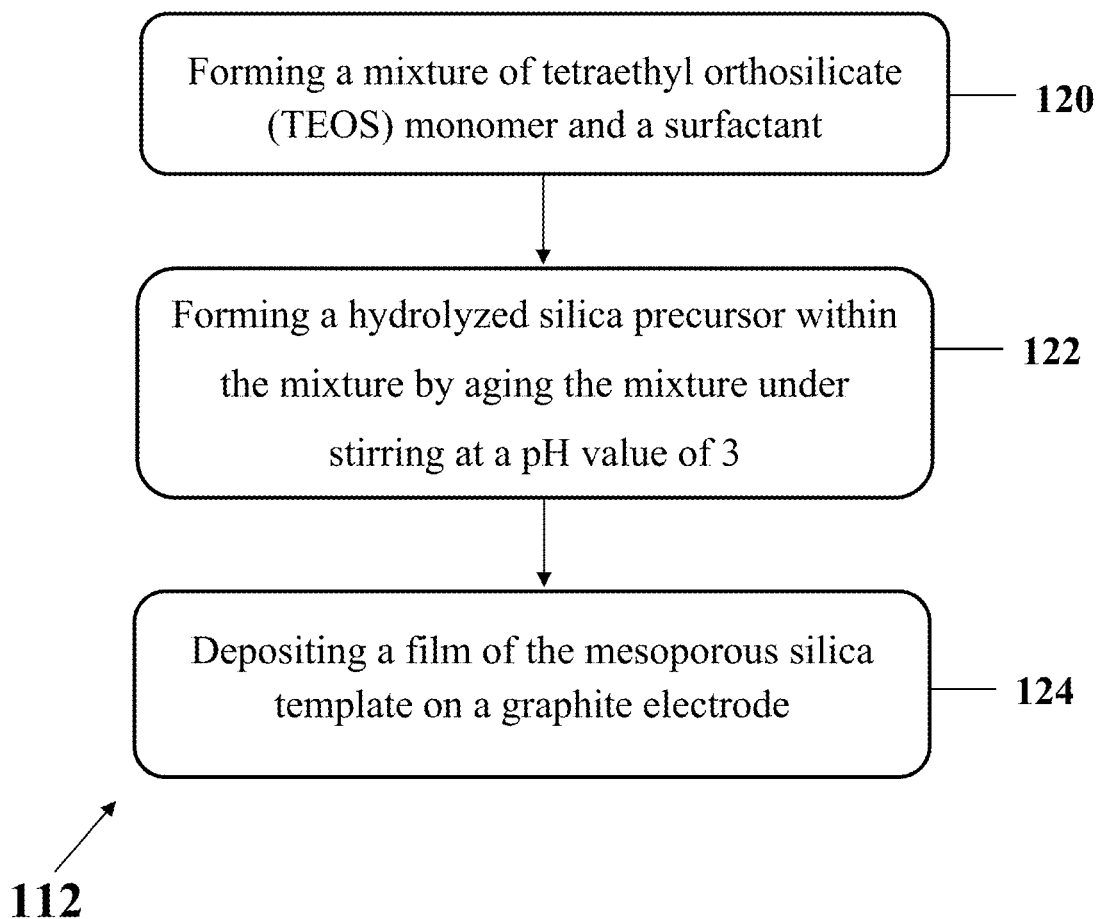
FIG. 1C illustrates a method for preparing the mesoporous silica template, consistent with one or more exemplary embodiments of the present disclosure.

Step 112 may include preparing the mesoporous silica template. FIG. 1C shows an exemplary implementation of step 112 including an exemplary process for preparing the mesoporous silica template, consistent with exemplary embodiments of the present disclosure. Referring to FIG. 1C, preparing the mesoporous silica template (step 112) may include forming a mixture of tetraethoxysilane (TEOS) monomer and a surfactant (step 120), forming a hydrolyzed silica precursor within the mixture by aging the mixture under stirring at a pH value of 3 (step 122), and depositing a film of the mesoporous silica template on a graphite electrode (step 124).

Step 120 may include forming a mixture of tetraethoxysilane (TEOS) monomer and a surfactant by mixing the tetraethoxysilane (TEOS) monomer and the surfactant. In an exemplary embodiment, the surfactant may include cetyltrimethylammonium bromide (CTAB).

Step 122 may include forming a hydrolyzed silica precursor within the mixture by aging the mixture under stirring at a pH value of 3. In an exemplary implementation, the mixture of the tetraethoxysilane (TEOS) monomer and the surfactant obtained from step 120 may then be stirred at a constant pH value of about 3 to form the hydrolyzed silica precursor.

Step 124 may include depositing the film of the mesoporous silica template on the graphite electrode. In an exemplary implementation, step 124 may include immersing the graphite electrode in the mixture containing the formed hydrolyzed silica precursor, and applying a voltage between about −2.5 V and about −2 V to the mixture, resulting in depositing the film of the mesoporous silica template on the graphite electrode.

Figure 2A:
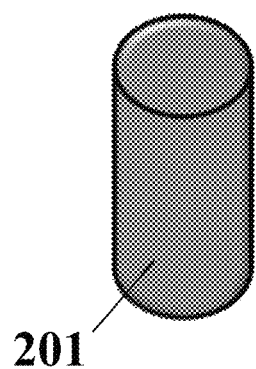
FIG. 2A illustrates a schematic view of an exemplary graphite electrode, consistent with one or more exemplary embodiments of the present disclosure.
Figure 2B:
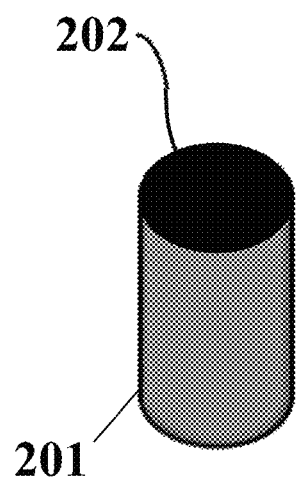
FIG. 2B illustrates a schematic view of an exemplary film of the mesoporous silica template formed on a surface of the exemplary graphite electrode, consistent with one or more exemplary embodiments of the present disclosure.

FIGS. 2A-2G show a schematic view of an exemplary implementation of method 110, consistent with one or more exemplary embodiments of the present disclosure. FIG. 2A shows a schematic view of an exemplary graphite electrode 201, consistent with one or more exemplary embodiments of the present disclosure. In an exemplary implementation of step 124, the exemplary graphite electrode 201 may be immersed in the mixture containing the formed hydrolyzed silica precursor, and a voltage between about −2.5 V and about −2 V may be applied to the mixture. As a result, an exemplary film of the mesoporous silica template 202 may be formed on a surface of the exemplary graphite electrode 201 as shown in FIG. 2B.

Figure 2C:
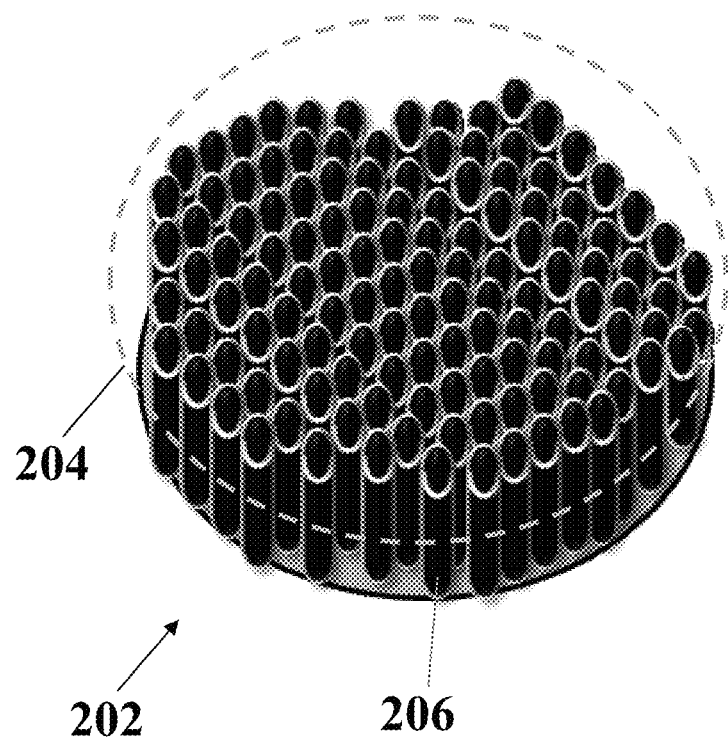
FIG. 2C illustrates a schematic view of an exemplary implementation of the prepared mesoporous silica template, consistent with one or more exemplary embodiments of the present disclosure.

FIG. 2C shows a schematic view of an exemplary implementation of the mesoporous silica template 202 prepared in step 112 of method 110, consistent with one or more exemplary embodiments of the present disclosure. In an exemplary implementation, the mesoporous silica template 202 may include a plurality of channels 204. In an exemplary embodiment, each channel 206 of the plurality of channels 204 may have a diameter less than about 50 nm and a length of less than about 100 nm. In another exemplary embodiment, each channel 206 of the plurality of channels 204 may have a diameter less than about 10 nm and a length of less than about 50 nm. Exemplary fabricated mesoporous silica template 202 with the plurality of channels 204 in nanometer dimensions may be utilized then for forming the plurality of nanomotors (step 114) within the mesoporous silica template 202; thereby, resulting in forming the plurality of nanomotors in nanometer scales. Exemplary formed plurality of nanomotors with nanometer dimensions may have remarkable properties that significantly increase their efficiency in applications thereof.

In an exemplary embodiment, the mesoporous silica template 202 may include an oriented mesoporous silica template 202 as shown in FIG. 2C. The oriented mesoporous silica template 202 may include plurality of channels 204, which may be vertically oriented in a regular manner.

Step 112 may further include removing the graphite electrode 201 with the film of the mesoporous silica template 202 from the mixture, rinsing the graphite electrode 201 with the film of the mesoporous silica template 202, drying the graphite electrode 201 with the film of the mesoporous silica template 202 at a temperature between about 100° C. and about 150° C., removing/extracting the surfactant from the film of the mesoporous silica template 202 by immersing the graphite electrode 201 with the film of the mesoporous silica template 202 in a solution of ethanol and HCl under stirring, washing the graphite electrode 201 with the film of the mesoporous silica template 202, and blowing the graphite electrode 201 with the film of the mesoporous silica template 202 with Nitrogen ($N_2$).

Figure 1D:
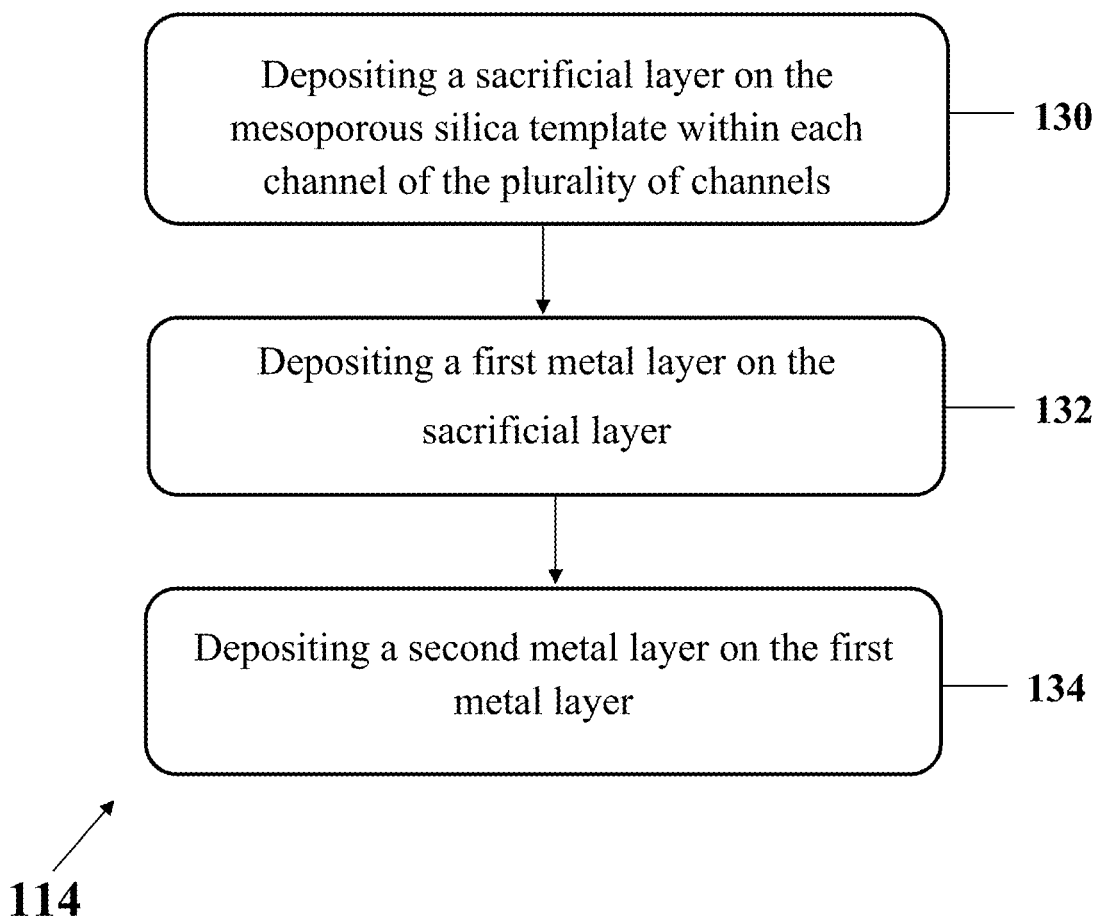
FIG. 1D illustrates an exemplary process for forming the plurality of nanomotors within the mesoporous silica template, consistent with one or more exemplary embodiments of the present disclosure.

Step 114 may include forming the plurality of nanomotors within the mesoporous silica template. FIG. 1D shows an exemplary implementation of step 114 including an exemplary process for forming the plurality of nanomotors within the mesoporous silica template, consistent with exemplary embodiments of the present disclosure. Referring to FIG. 1D, forming the plurality of nanomotors within the mesoporous silica template (step 114) may include depositing a sacrificial layer on the mesoporous silica template within each channel of the plurality of channels (step 130), depositing a first metal layer on the sacrificial layer (step 132), and depositing a second metal layer on the first metal layer (step 134). In an exemplary embodiment, the sacrificial layer may include a sacrificial material. The first metal layer may include platinum (Pt), or palladium (Pd), or combinations thereof, and the second metal layer may include Nickel (Ni), or Cobalt (Co), or combinations thereof.

Figure 2D:
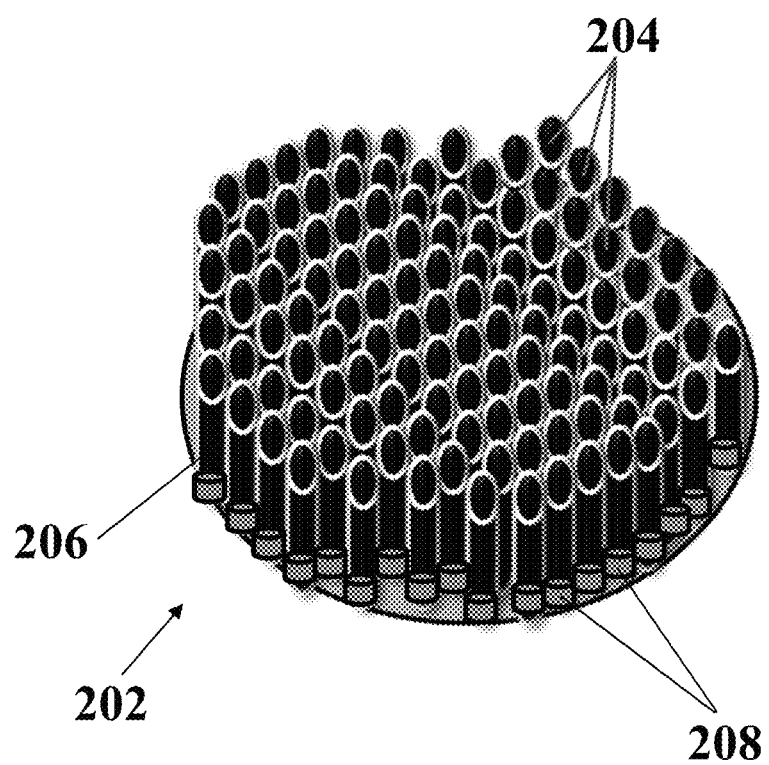
FIG. 2D illustrates a schematic view of an exemplary implementation of depositing a sacrificial layer on the mesoporous silica template within each channel of the plurality of channels, consistent with one or more exemplary embodiments of the present disclosure.

FIG. 2D shows a schematic view of an exemplary implementation of depositing a sacrificial layer 208 on the mesoporous silica template 202 within each channel 206 of the plurality of channels 204 (step 130), consistent with one or more exemplary embodiments of the present disclosure. In an exemplary implementation, depositing the sacrificial layer 208 on the mesoporous silica template 202 within each channel 206 of the plurality of channels 204 may include immersing the mesoporous silica template 202 in a solution of a sacrificial material, forming a $N_2$-saturated solution of the sacrificial material by $N_2$ saturating of the solution of the sacrificial material, and applying a voltage between about 0.2 V and about 0.4 V to the $N_2$-saturated solution of the sacrificial material under stirring the $N_2$-saturated solution of the sacrificial material. As a result, the sacrificial layer 208 may be formed on the mesoporous silica template 202 within each channel 206.

In an exemplary embodiment, the sacrificial material may include Prussian blue (PB) (Iron hexacyanoferrate), or Nickel hexacyanoferrate (NiHCF), or Cobalt hexacyanoferrate (CoHCF), or Copper hexacyanoferrate, or combinations thereof. In an exemplary embodiment, the solution of the sacrificial material may include a solution containing a ferricyanide salt, for example, potassium ferricyanide ($K_3Fe(CN)_6$), a chloride salt, and a salt of sodium (Na), or potassium (K), or combinations thereof. The chloride salt may include $FeCl_3$, or $NiCl_2$, or $CoCl_2$, or combinations thereof. The salt of sodium (Na) or potassium (K) may include KCl, or NaCl, or $KNO_3$, or combinations thereof.

Figure 2E:
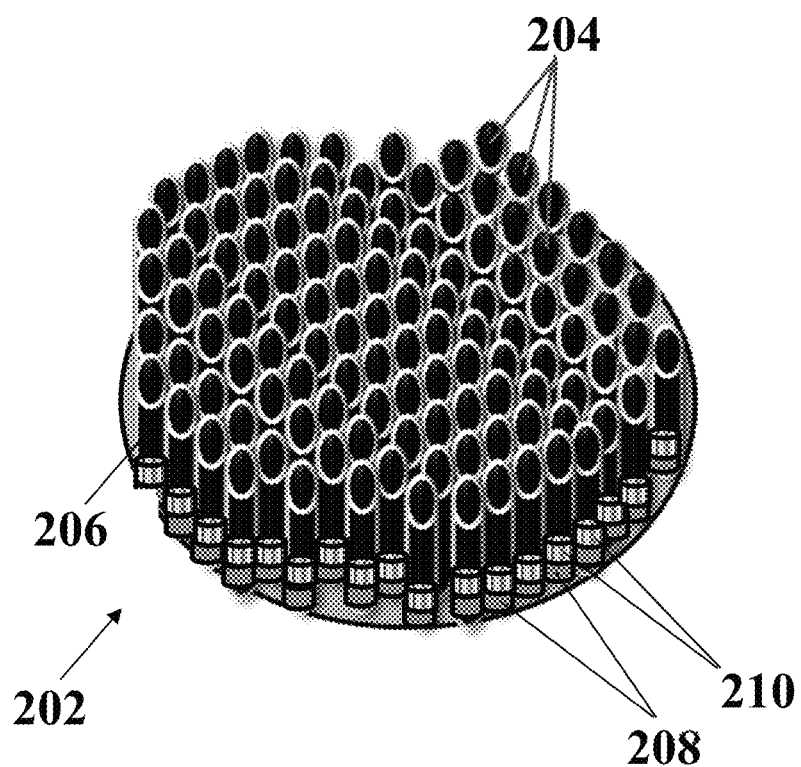
FIG. 2E illustrates a schematic view of an exemplary implementation of depositing a first metal layer on the sacrificial layer, consistent with one or more exemplary embodiments of the present disclosure.

FIG. 2E shows a schematic view of an exemplary implementation of depositing a first metal layer 210 on the sacrificial layer 208 (step 132), consistent with one or more exemplary embodiments of the present disclosure. In an exemplary implementation, depositing the first metal layer 210 on the sacrificial layer 208 may include depositing the first metal layer 210 on the sacrificial layer 208 within each channel 206 of the plurality of channels 204 of the mesoporous silica template 202.

In an exemplary implementation, depositing the first metal layer 210 on the sacrificial layer 208 (step 132) may include immersing the mesoporous silica template 202 with the sacrificial layer 208 deposited within each channel 206 of the plurality of channels 204 in a first solution of a metal salt of platinum (Pt), or palladium (Pd), or combinations thereof, forming a $N_2$-saturated first solution by $N_2$ saturating of the first solution, and applying a voltage between about −0.5V and about −0.4V to the $N_2$-saturated first solution under stirring the $N_2$-saturated first solution. As a result, first metal layer 210 may be formed on the sacrificial layer 208 within each channel 206 of the mesoporous silica template 202.

Figure 2F:
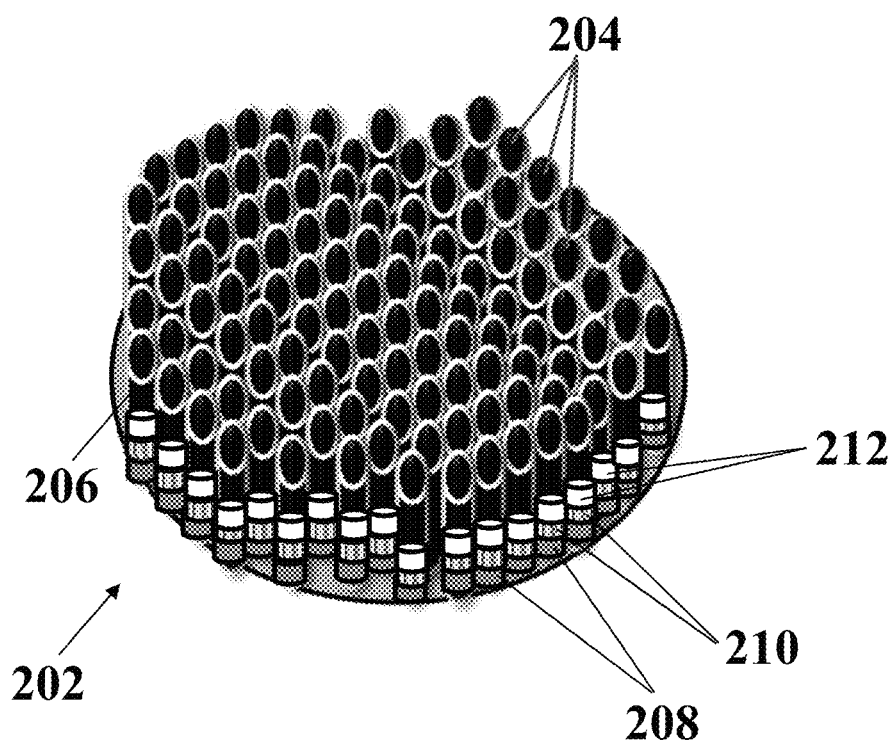
FIG. 2F illustrates a schematic view of an exemplary implementation of depositing a second metal layer on the first metal layer, consistent with one or more exemplary embodiments of the present disclosure.

FIG. 2F shows a schematic view of an exemplary implementation of depositing a second metal layer 212 on the first metal layer 210 (step 134), consistent with one or more exemplary embodiments of the present disclosure. In an exemplary implementation, depositing the second metal layer 212 on the first metal layer 210 may include depositing the second metal layer 212 on the first metal layer 210, which may be deposited on the sacrificial layer 208 within each channel 206 of the plurality of channels 204 of the mesoporous silica template 202.

In an exemplary implementation, depositing the second metal layer 212 on the first metal layer 210 (step 134) may include immersing the mesoporous silica template 202 with the first metal layer 210 deposited on the sacrificial layer 208 within each channel 206 of the plurality of channels 204 in a second solution of a magnetic material, for example, Nickel (Ni), Cobalt (Co), or combinations thereof, forming a $N_2$-saturated second solution by $N_2$ saturating of the second solution, and applying a voltage between about −1.2 V and about −1 V to the $N_2$-saturated second solution. As a result, second metal layer 212 may be formed on the first metal layer 210, which may be deposited on the sacrificial layer 208 within each channel 206 of the mesoporous silica template 202.

In an exemplary implementation, step 114 may further include depositing a third metal layer on the second metal layer. In an exemplary embodiment, the third metal layer may include gold (Au). The gold layer may be used in biological and environmental applications as an adsorption substrate for further treatments. For example, Au may adsorb the toxic substance; thereby, enhancing the decomposition reaction of the toxic substance in exemplary embodiments of the present disclosure.

Figure 1E:
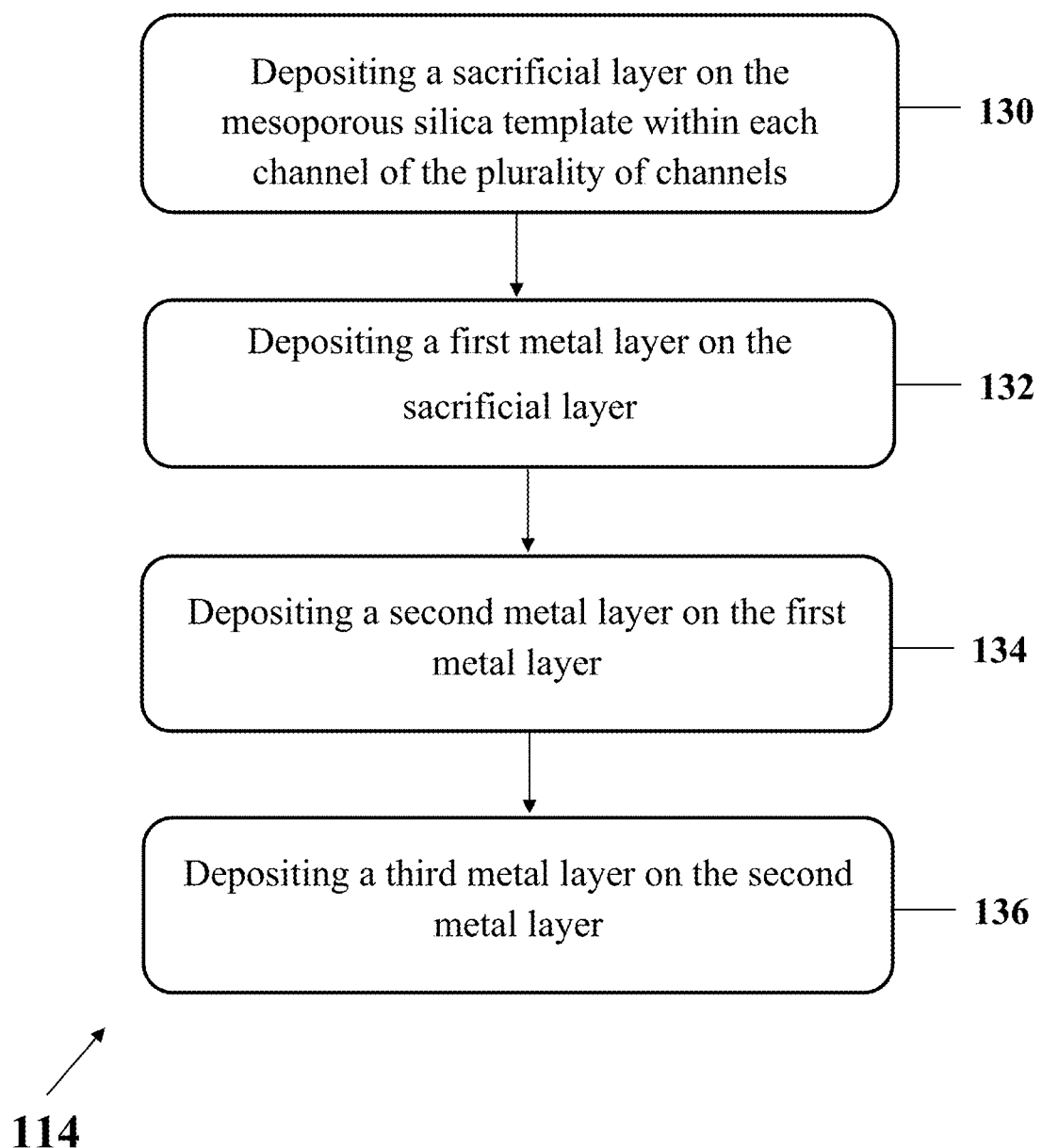
FIG. 1E illustrates an exemplary process for forming the plurality of nanomotors within the mesoporous silica template, consistent with one or more exemplary embodiments of the present disclosure.

FIG. 1E shows another exemplary implementation of step 114 representing an exemplary process for forming the plurality of nanomotors within the mesoporous silica template, consistent with exemplary embodiments of the present disclosure. Referring to FIG. 1E, forming the plurality of nanomotors within the mesoporous silica template (step 114) may include depositing a sacrificial layer on the mesoporous silica template within each channel of the plurality of channels (step 130), depositing a first metal layer on the sacrificial layer (step 132), depositing a second metal layer on the first metal layer (step 134), and depositing a third metal layer on the second metal layer (step 136). In an exemplary embodiment, the sacrificial layer may include a sacrificial material, which may include Prussian blue (PB) (Iron hexacyanoferrate), or Nickel hexacyanoferrate (NiHCF), or Cobalt hexacyanoferrate (CoHCF), or Copper hexacyanoferrate, or combinations thereof. The first metal layer may include platinum (Pt), or palladium (Pd), or combinations thereof, and the second metal layer may include Nickel (Ni), or Cobalt (Co), or combinations thereof. Moreover, the third metal layer may include gold (Au).

Figure 2G:
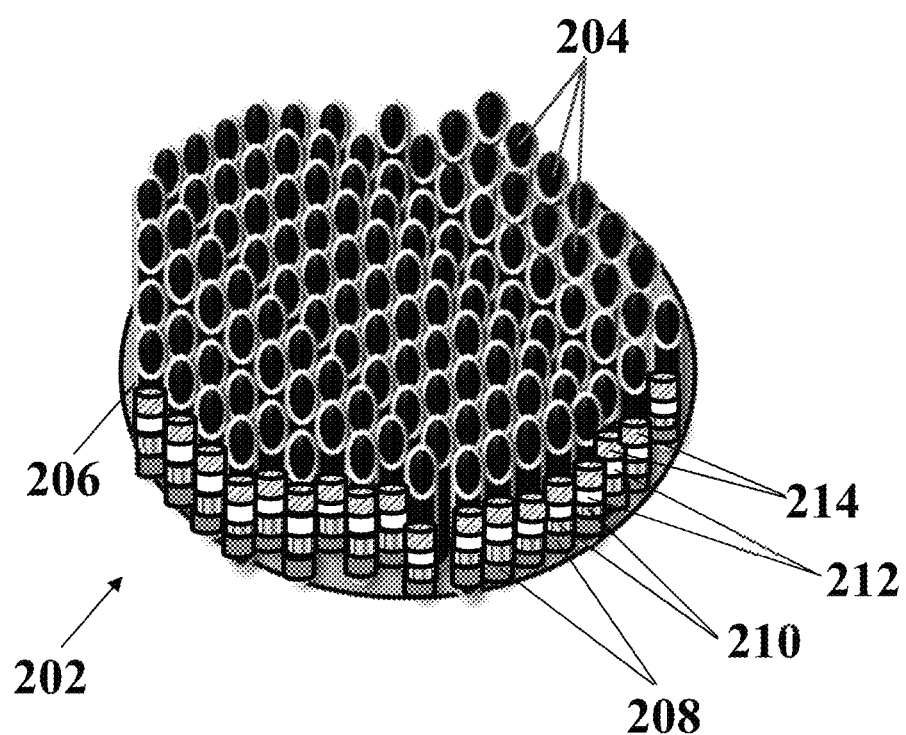
FIG. 2G illustrates a schematic view of an exemplary implementation of depositing a third metal layer on the second metal layer, consistent with one or more exemplary embodiments of the present disclosure.

FIG. 2G shows a schematic view of an exemplary implementation of depositing a third metal layer 214 on the second metal layer 212 (step 136), consistent with one or more exemplary embodiments of the present disclosure. In an exemplary implementation, depositing the third metal layer 214 on the second metal layer 212 may include depositing the third metal layer 214 on the second metal layer 212, which may be deposited on the first metal layer 210 within each channel 206 of the plurality of channels 204 of the mesoporous silica template 202.

In an exemplary implementation, depositing the third metal layer 214 on the second metal layer 212 (step 136) may include immersing the mesoporous silica template 202 with the second metal layer 212 deposited on the first metal layer 210, which may deposited on the sacrificial layer 208 within each channel 206 of the plurality of channels 204 in a third solution of gold (Au), forming a $N_2$-saturated third solution by $N_2$ saturating of the third solution, and applying a voltage between about −0.5 V and about −0.4 V to the $N_2$-saturated third solution. As a result, third metal layer 214 may be formed on the second metal layer 212, which may be deposited on the first metal layer 210 that may be deposited on the sacrificial layer 208 within each channel 206 of the mesoporous silica template 202.

Step 114 may include forming the plurality of nanomotors within the mesoporous silica template 202 as described hereinabove, so that a nanomotor may be formed within each channel 206 of the plurality of channels 204 of the mesoporous silica template 202. As a result, the plurality of nanomotors may be formed within the mesoporous silica template 202.

Step 116 may include separating the plurality of nanomotors from the mesoporous silica template 202. In an exemplary embodiment, separating the plurality of nanomotors from the mesoporous silica template 202 may include immersing the mesoporous silica template 202 containing the plurality of nanomotors in an alkaline solution, for example, a solution of NaOH, or KOH. The alkaline solution may have a pH value of about 13 or more. In another exemplary embodiment, separating the plurality of nanomotors from the mesoporous silica template 202 may include immersing the mesoporous silica template 202 containing the plurality of nanomotors in a solution of Hydrogen Fluoride (HF). As a result, the plurality of nanomotors formed within the plurality of channels 204 of the mesoporous silica template 202 may be separated from the mesoporous silica template 202 and the sacrificial layer 208.

Figure 2H:
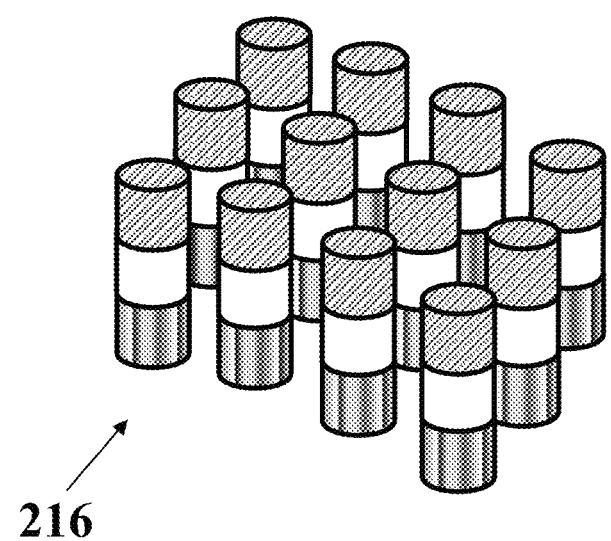
FIG. 2H illustrates a schematic view of an exemplary implementation of the plurality of nanomotors separated from the mesoporous silica template, consistent with one or more exemplary embodiments of the present disclosure.

FIG. 2H shows a schematic view of an exemplary implementation of the plurality of nanomotors 216 that may be separated from the mesoporous silica template 202, consistent with one or more exemplary embodiments of the present disclosure.

Figure 3A:
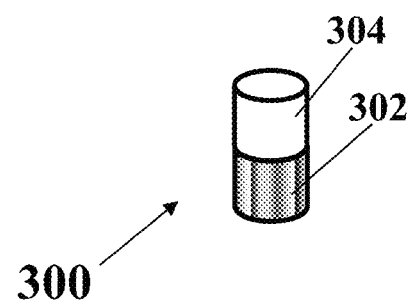
FIG. 3A illustrates a schematic view of an exemplary implementations of a nanomotor of the plurality of nanomotors including a first segment, and a second segment, consistent with one or more exemplary embodiments of the present disclosure.
Figure 3B:
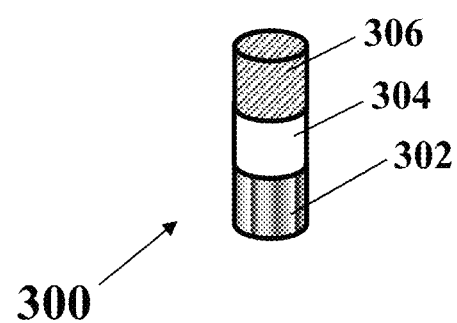
FIG. 3B illustrates a schematic view of an exemplary implementations of a nanomotor of the plurality of nanomotors including a first segment, a second segment, and a third segment, consistent with one or more exemplary embodiments of the present disclosure.

FIGS. 3A and 3B show schematic views of two different exemplary implementations of a nanomotor 300 of the plurality of nanomotors 216 which may be formed in step 114 and then may be separated in step 116, consistent with one or more exemplary embodiments of the present disclosure. Nanomotor 300 may include a nanorod 300 with a diameter of less than about 50 nm and a length of less than about 100 nm. In an exemplary embodiment, nanomotor 300 may include the nanorod 300 with a diameter of less than about 10 nm and a length of less than about 50 nm.

Referring to FIG. 3A, nanorod 300 may include a first segment 302, and a second segment 304. In an exemplary embodiment, the first segment 302 may include a metal, which may include platinum (Pt), or palladium (Pd), or combinations thereof. Moreover, the second segment 304 may include a magnetic material, which may include Nickel (Ni), or Cobalt, or combinations thereof.

Referring to FIG. 3B, nanorod 300 may further include a third segment 306, where the second segment 304 may be placed between the first segment 302 and the third segment 306. Nanorod 300 may include the first segment 302, the second segment 304, and the third segment 306. In an exemplary embodiment, the first segment 302 may include a metal, which may include Platinum (Pt), or Palladium (Pd), or combinations thereof. The second segment 304 may include a magnetic material, which may include Nickel (Ni), or Cobalt, or combinations thereof. In addition, the third segment 306 may include gold (Au).

Referring again to FIG. 1A, as a representation of exemplary method 100 for decontamination of a toxic substance, step 104 may include putting the plurality of nanomotors 216 in contact with the contaminant solution including the toxic substance. In an exemplary embodiment, the toxic substance may include an organophosphate (OP) nerve agent, for example, paraoxon-methyl (POM), or paraoxon-ethyl (POE).

In an exemplary implementation, step 104 may include adding hydrogen peroxide ($H_2O_2$) and the plurality of nanomotors 216 to the contaminant solution causing a chemical reaction between the toxic substance and $H_2O_2$. $H_2O_2$ may act as a source of hydroperoxyl radical (OOH) which may react with the toxic substance and consequently, decomposing the toxic substance. In addition, $H_2O_2$ may act as a fuel for the plurality of nanomotors 216 to motivate the plurality of nanomotors 216 within the contaminant solution. It should be noted that the first segment 302 of the plurality of nanomotors 216 may act as a catalyst for decomposition of $H_2O_2$; thereby, forming hydroperoxyl radical (.OOH).

In an exemplary implementation, putting the plurality of nanomotors 216 in contact with the contaminant solution may further include adding an activator agent to the contaminant solution. In an exemplary embodiment, the activator agent may include an alkaline compound, for example, NaOH or $NaHCO_3$. The activator agent may react with $H_2O_2$ and produce .OOH radicals as nucleophile components, which may increase the catalytic behavior of the plurality of nanomotors 216.

In an exemplary implementation, putting the plurality of nanomotors 216 in contact with the contaminant solution may further include guiding the plurality of nanomotors by a magnetic field in the contaminant solution in order to move the plurality of nanomotors 216 through the contaminant solution for providing more contact between the plurality of nanomotors 216 and the contaminant solution. In an exemplary embodiment, the plurality of nanomotors may be guided by a magnet through the contaminant solution.

Step 104 may include decomposing the toxic substance due to the chemical reaction between the toxic substance and $H_2O_2$ in the presence of the plurality of nanomotors 216. It should be noted that the plurality of nanomotors 216 may act as a catalyst for the reaction between the toxic substance and $H_2O_2$. The plurality of nanomotors 216 may provide an appropriate interface for contacting and reacting between the toxic substance and $H_2O_2$. In addition, the plurality of nanomotors 216 may be guided magnetically through the contaminant solution to increase the contact between the toxic substance and $H_2O_2$ in order to enhance the efficiency of the chemical reaction.

Example 1: Fabrication of Oriented Mesoporous Silica Template

In this example, an exemplary plurality of nanomotors were fabricated using oriented mesoporous silica films obtained by electro-assisted self-assembly (EASA). An oriented mesoporous silica modified electrode was prepared according to the following procedure. Briefly, tetraethoxysilane (TEOS, 99%, 75 mM) and cetyltrimethylammonium bromide (CTAB, 99%, 24 mM) were added to a solution including about 20 mL of ethanol, and about 20 mL of an aqueous solution of $NaNO_3$ (0.1 M) while stirring. HCl (36%) was added in order to reach a pH value of about 3. The solution was aged under stirring for about 2.5 hours at pH value of about 3 in order to produce hydrolyzed precursors before the electrosynthesis of mesoporous silica process. Then, a graphite rod electrode (0.5 cm diameter, and 2 cm length) was immersed in the obtained aged solution and a voltage of about −2.2 V versus Ag|AgCl|KClsat was applied for about 20 seconds in order to generate the necessary hydroxyl ions (OH⁻) to accelerate the condensation of the silica precursors. The electrode was then quickly removed from the solution and immediately rinsed with distilled water. The electrodeposited surfactant-template film was dried overnight in an oven at a temperature of about 130° C. Then, the extraction of surfactant was carried out by immersing the film in an ethanol (95%-96%) solution containing HCl (36%, 0.1 M) under moderate stirring for about 5 minutes. Subsequently, washing with water and blowing by nitrogen steps were followed.

Figure 4:
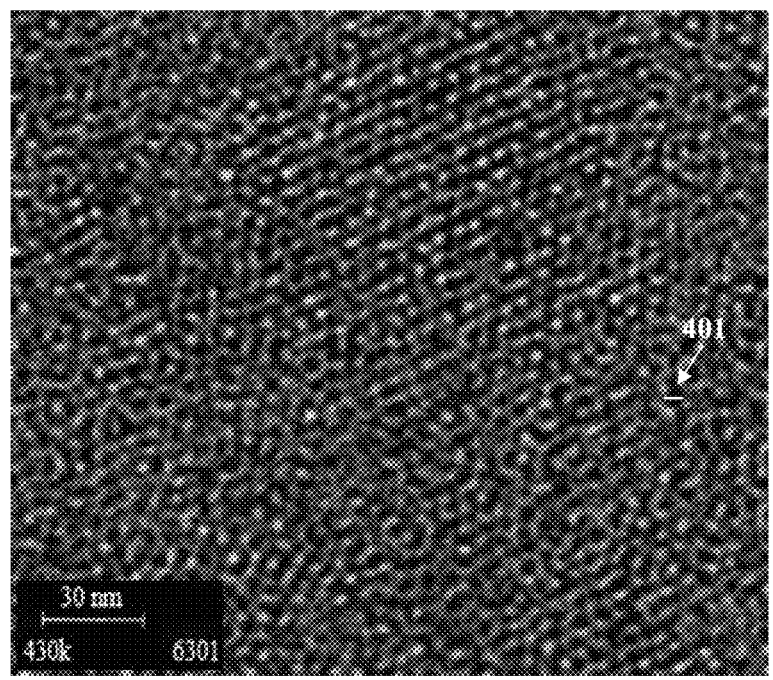
FIG. 4 illustrates a transmission electron microscopy (TEM) image of an exemplary prepared mesoporous silica template, consistent with one or more exemplary embodiments of the present disclosure.

FIG. 4 shows a transmission electron microscopy (TEM) image of exemplary prepared mesopores silica template. It may be observed that the fabricated mesoporous silica template includes highly ordered channels with a diameter of less than about 7 nm. For example, the diameter 401 shown in FIG. 4 is about 6.4 nm.

Example 2: Fabrication of Nanomotors

In this example, a plurality of exemplary nanomotors were fabricated within the channels of an exemplary mesoporous silica template fabricated in accordance with EXAMPLE 1 hereinabove. In the first step, a sacrificial layer of Prussian blue (PB) was deposited using chronoamperometry under the potential of about +0.3 V for about 5 minutes by immersing the oriented mesoporous silica modified electrode in a fresh solution containing $FeCl_3$ (0.1 mM), potassium ferricyanide ($K_3[Fe(CN)_6]$) (0.1 mM) and KCl (0.1 M) to penetrate inside the mesoporous channels of silica. In the second step, the modified electrode was immersed in a NaNO$_3$ (0.1 M) solution containing Na$_2$PtCl$_6$ (0.01 mM) and an electrical voltage of about −0.45 V was applied for about 10 minutes for electrochemical reduction of Na$_2$PtCl$_6$ inside the mesoporous channels of silica. In the third step, the obtained modified electrode was washed with water and immersed in NiCl$_2$ (0.005 mM) solution containing H$_3$BO$_3$ (0.1 M) with a pH value of about 3 and a voltage of about −1.1 V was applied for 5 minutes. In the fourth step, the modified electrode was washed with water and immersed in a NaNO$_3$ (0.1 M) solution containing NaAuCl$_4$ (0.01 mM) solution and a voltage of about −0.45 V was applied for about 20 minutes. The obtained modified electrode was then washed with water for about 10 seconds and heated at about 100° C. for about 1 hour. Finally, the obtained modified electrode was kept in NaOH (0.1 M) solution overnight to remove sacrificial layer and the silica matrix. After washing with pure water, nanorod shape motors were collected by magnetic force. The fabricated nanorod shape motor (Pt—Ni—Au) was fixed by magnetic force and rinsed thoroughly with water to wash away the adsorbed silicate. The fabricated nanomotors were stored in pure water (10 MΩ cm$^{-1}$) when they were not in use. All of the electrochemical reduction processes were carried out under stirring condition and in N$_2$ saturated solution. The characterization of nanomotors was examined by transmission electron microscopy (TEM) and energy-dispersive X-ray (EDX) spectroscopy. The electrochemical reduction processes were performed using a electrochemical system. A three-electrode was employed and assembled the cell, consisting of the oriented mesoporous silica modified graphite electrode (3.0 mm diameter) as the working electrode. Also, a platinum wire as a counter electrode and an Ag|AgCl|KClsat electrode as the reference electrode were used.

Figure 5A:
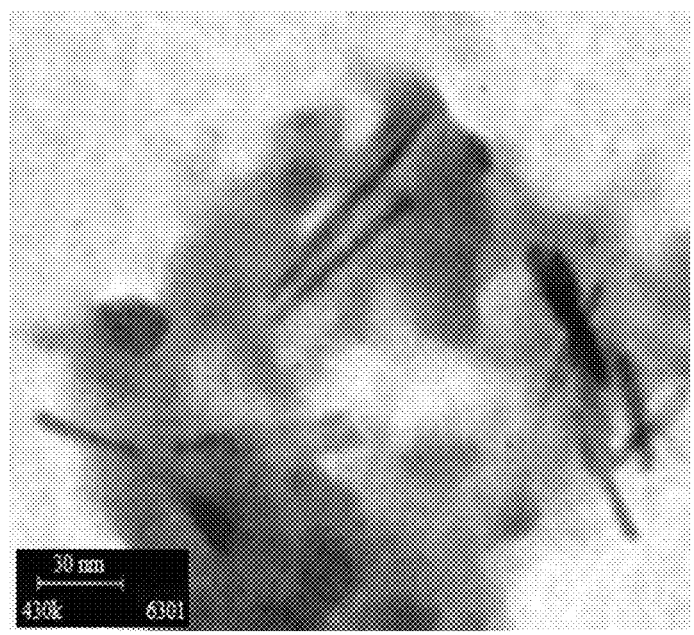
FIG. 5A illustrates a transmission electron microscopy (TEM) image of the fabricated nanomotors, consistent with one or more exemplary embodiments of the present disclosure.

FIG. 5A shows a transmission electron microscopy (TEM) image of exemplary fabricated nanomotors, consistent with one or more exemplary embodiments of the present disclosure. It may be seen that the prepared nanomotors have a rod structure. The width of the nanomotors may be estimated to be about 6 and the length of the nanomotors were estimated to be about 40 nm.

Figure 5B:
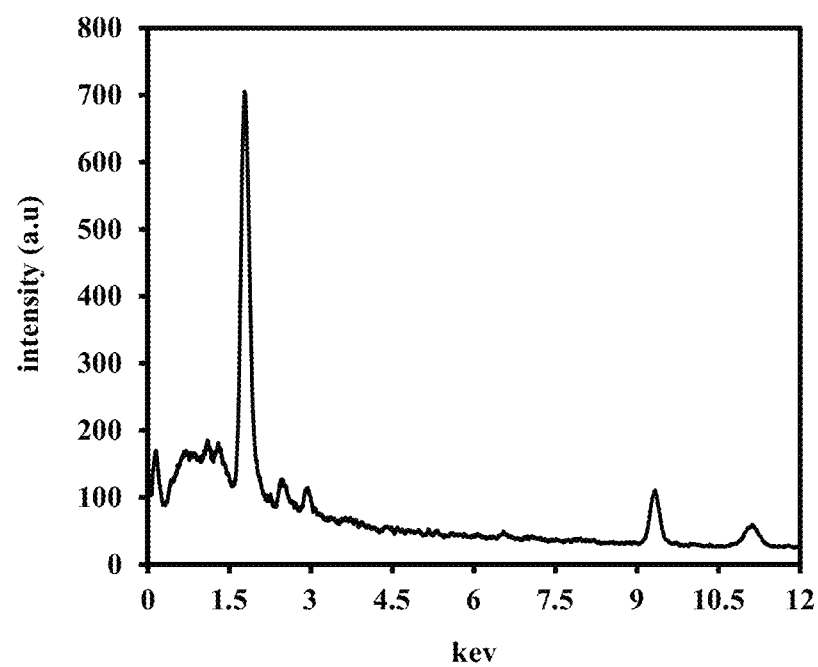
FIG. 5B illustrates an energy-dispersive X-ray (EDX) spectra of the fabricated nanomotors, consistent with one or more exemplary embodiments of the present disclosure.
Figure 6A:
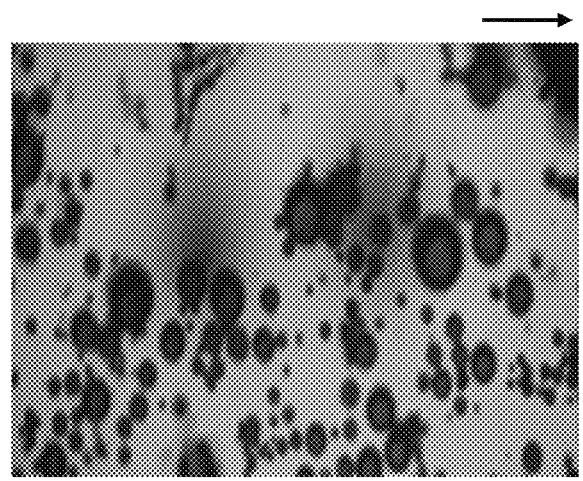
FIG. 6A illustrates the remote magnetic guidance of exemplary catalytic nanomotors in the presence of 1% $H_2O_2$ at time=0, consistent with one or more exemplary embodiments of the present disclosure.
Figure 6B:
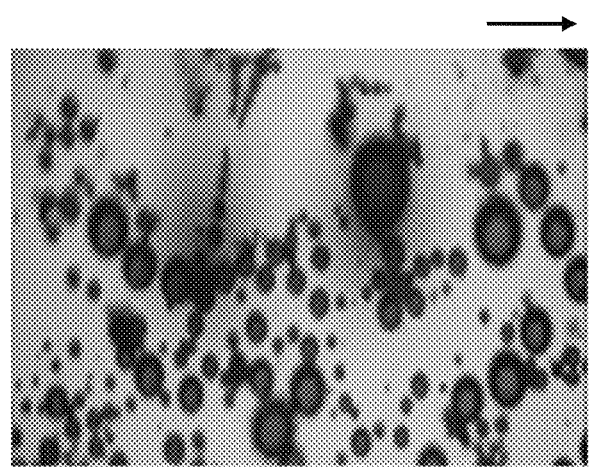
FIG. 6B illustrates the remote magnetic guidance of exemplary catalytic nanomotors in the presence of 1% $H_2O_2$ at time=1 second, consistent with one or more exemplary embodiments of the present disclosure.
Figure 6C:
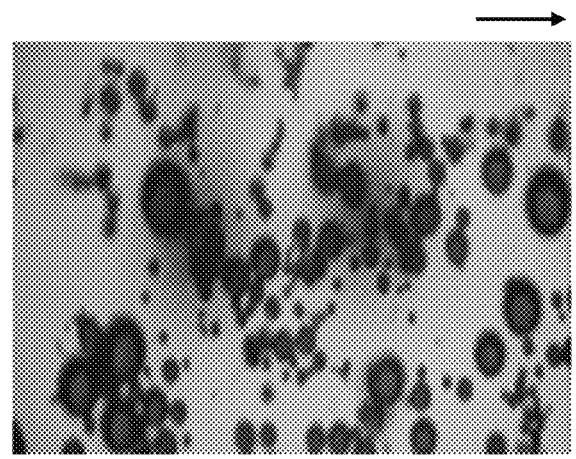
FIG. 6C illustrates the remote magnetic guidance of exemplary catalytic nanomotors in the presence of 1% $H_2O_2$ at time=2 seconds, consistent with one or more exemplary embodiments of the present disclosure.
Figure 6D:
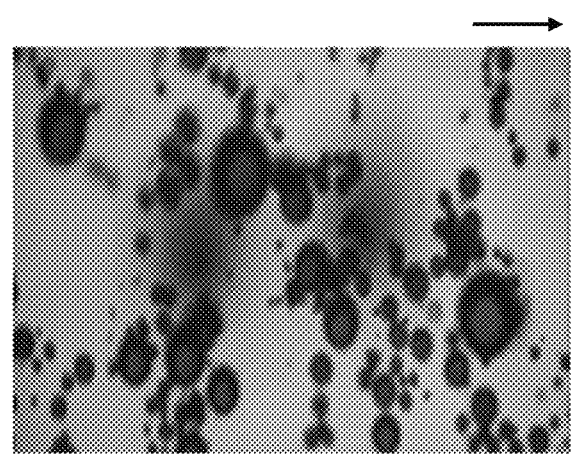
FIG. 6D illustrates the remote magnetic guidance of exemplary catalytic nanomotors in the presence of 1% $H_2O_2$ at time=3 seconds, consistent with one or more exemplary embodiments of the present disclosure.

FIG. 5B illustrates an energy-dispersive X-ray (EDX) spectra of the fabricated nanomotors, consistent with one or more exemplary embodiments of the present disclosure. The elemental analysis of the obtained nanomotor carried out by EDX clearly indicated that the prepared nanorod contains about 53.2 wt % gold, about 12.4 Ni wt %, and about 34.4 wt % platinum.

Example 3: The Remote Control of Nanomotors

In this example, the fabricated nanomotors of EXAMPLE 2 were guided in a solution containing about 1% hydrogen peroxide (H$_2$O$_2$), as a fuel, by a magnetic force. A neodymium (NdFeB) magnet was used for magnetically controlled movement of the nanomotors.

FIGS. 6A-6D show a series of optical images demonstrating the route of the nanomotor with the elapse of time from FIG. 6A to FIG. 6D in a duration of about 1 second in the solution containing about 1% hydrogen peroxide (H$_2$O$_2$), as a fuel, via a magnetically guided movement, consistent with one or more exemplary embodiments of the present disclosure. As shown in FIGS. 6A-6D, in the presence of an external magnetic force, the catalytic nanomotors move towards the magnetic direction, wherein the arrows show the direction of the applied magnetic field.

Example 4: Catalytic Behavior of Nanomotors for the Decontamination of Paraoxon-Methyl (POM)

In this example, the catalytic performance of the prepared nanomotors toward the large quantities of decontaminating reagents was investigated. Paraoxon-methyl (POM) was selected as a model for environmental remediation in presence of H$_2$O$_2$ as oxidant/fuel and NaHCO$_3$ as an activator. The UV-vis spectra of the reaction mixture were monitored with the progress of the catalytic decontamination of POM in a water sample of a local river. To investigate the catalytic degradation of POM, about 15 mL of POM (25 μM) was added to about 0.1 M NaHCO$_3$ and 2% NaCl solution containing 1% H$_2$O$_2$. The mixture was sonicated for about 2 minutes at room temperature. Then, about 0.25 mL of nanomotors (0.5 mg mL$^{-1}$) was added to the mixture.

Figure 7A:
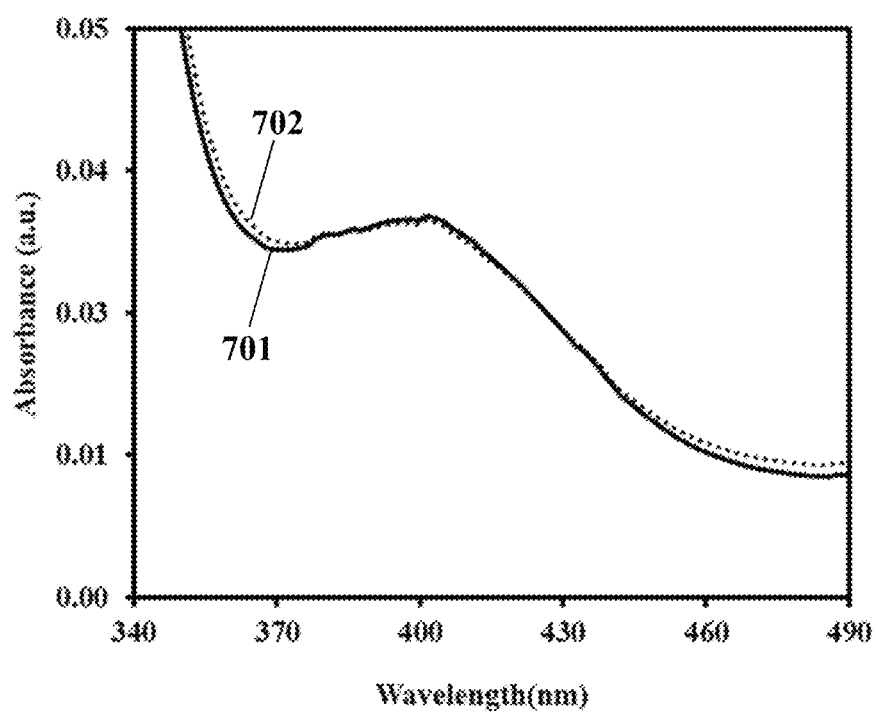
FIG. 7A illustrates absorbance UV-vis spectra for the para-nitrophenol (p-NP) produced from the decontamination of POM in local river water obtained in the presence of the nanomotors, consistent with one or more exemplary embodiments of the present disclosure.
Figure 7B:
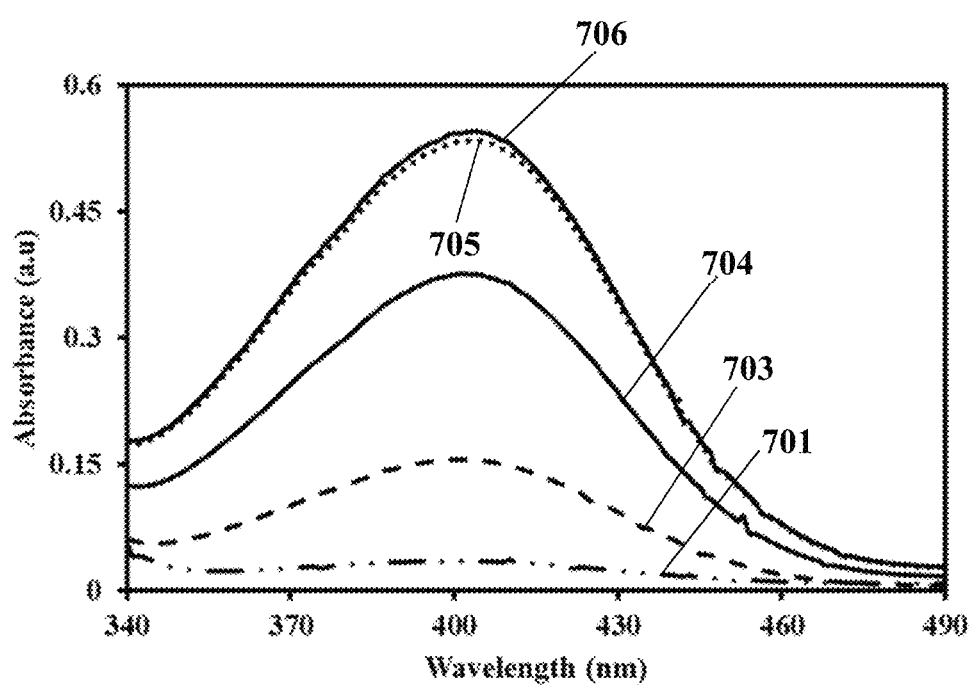
FIG. 7B illustrates absorbance UV-vis spectra for the para-nitrophenol (p-NP) produced from the decontamination of POM in local river water obtained in the absence of the nanomotors, consistent with one or more exemplary embodiments of the present disclosure.

FIGS. 7A and 7B show absorbance UV-vis spectra for the para-nitrophenol (p-NP) produced from the decontamination of POM in local river water obtained in the absence (FIG. 7A) and presence (FIG. 7B) of the nanomotors, consistent with one or more exemplary embodiments of the present disclosure. In the absence of nanomotors as shown in FIG. 7A, the degradation of POM was negligible and the absorption peak 702 remained nearly unaltered even after about 1 hour in comparison with the absorption peak 702 at initial time of t=0. It may be observed from FIG. 7B that after the addition of nanomotors to the aqueous solution, the absorption of the peak at 400 nm increased rapidly from initial time (t=0) curve 701 to t=15 min (curve 703), t=30 min (curve 704), t=45 min (curve 705), and t=60 min (curve 706), which may be attributed to the degradation of POM to p-NP. Therefore, the proposed nanomotor may be a suitable self-propelled nanomotor for effective and rapid decontamination of environmental pollution components. It should be noted that the generated bubbles on the nanomotors not only provide the necessary force to move them ahead in media solution but also accelerate the decontamination of water pollution components. Thus, one of the most important advantage of self-propelled nanomotors may be the occurrence of a kind of self-mixing of solution when they used for the decontamination of water pollution components, as they move around in the solution; this will severely accelerate the decontamination reactions.

While the foregoing has described what are considered to be the best mode and/or other examples, it is understood that various modifications may be made therein and that the subject matter disclosed herein may be implemented in various forms and examples, and that the teachings may be applied in numerous applications, only some of which have been described herein. It is intended by the following claims to claim any and all applications, modifications and variations that fall within the true scope of the present teachings.

Unless otherwise stated, all measurements, values, ratings, positions, magnitudes, sizes, and other specifications that are set forth in this specification, including in the claims that follow, are approximate, not exact. They are intended to have a reasonable range that is consistent with the functions to which they relate and with what is customary in the art to which they pertain.

The scope of protection is limited solely by the claims that now follow. That scope is intended and should be interpreted to be as broad as is consistent with the ordinary meaning of the language that is used in the claims when interpreted in light of this specification and the prosecution history that follows and to encompass all structural and functional equivalents. Notwithstanding, none of the claims are intended to embrace subject matter that fails to satisfy the requirement of Sections 101, 102, or 103 of the Patent Act, nor should they be interpreted in such a way. Any unintended embracement of such subject matter is hereby disclaimed.

Except as stated immediately above, nothing that has been stated or illustrated is intended or should be interpreted to cause a dedication of any component, step, feature, object, benefit, advantage, or equivalent to the public, regardless of whether it is or is not recited in the claims.

It will be understood that the terms and expressions used herein have the ordinary meaning as is accorded to such terms and expressions with respect to their corresponding respective areas of inquiry and study except where specific meanings have otherwise been set forth herein. Relational terms such as first and second and the like may be used solely to distinguish one entity or action from another without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "a" or "an" does not, without further constraints, preclude the existence of additional identical elements in the process, method, article, or apparatus that comprises the element.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various implementations. This is for purposes of streamlining the disclosure, and is not to be interpreted as reflecting an intention that the claimed implementations require more features than are expressly recited in each claim. Rather, as the following claims reflect, inventive subject matter lies in less than all features of a single disclosed implementation. Thus, the following claims are hereby incorporated into the Detailed Description, with each claim standing on its own as a separately claimed subject matter.

While various implementations have been described, the description is intended to be exemplary, rather than limiting and it will be apparent to those of ordinary skill in the art that many more implementations and implementations are possible that are within the scope of the implementations. Although many possible combinations of features are shown in the accompanying figures and discussed in this detailed description, many other combinations of the disclosed features are possible. Any feature of any implementation may be used in combination with or substituted for any other feature or element in any other implementation unless specifically restricted. Therefore, it will be understood that any of the features shown and/or discussed in the present disclosure may be implemented together in any suitable combination. Accordingly, the implementations are not to be restricted except in light of the attached claims and their equivalents. Also, various modifications and changes may be made within the scope of the attached claims.

What is claimed is:

1. A method for decontamination of a toxic substance, the method comprising:
fabricating a plurality of nanomotors, comprising:
preparing a mesoporous silica template, comprising a plurality of channels, each channel of the plurality of channels with a diameter less than 50 nm and a length of less than 100 nm;
forming the plurality of nanomotors within the mesoporous silica template, each nanomotor of the plurality of nanomotors formed within a channel of the plurality of channels; and
separating the plurality of nanomotors from the mesoporous silica template;
putting the plurality of nanomotors in contact with a contaminant solution comprising the toxic substance by adding hydrogen peroxide ($H_2O_2$) and the plurality of nanomotors to the contaminant solution causing a chemical reaction between the toxic substance and $H_2O_2$.

2. The method of claim 1, wherein each nanomotor of the plurality of nanomotors comprises a nanorod with a diameter of less than 50 nm and a length of less than 100 nm, the nanorod comprising:
a first segment comprising a metal from one of Platinum (Pt), Palladium (Pd), or combinations thereof; and
a second segment comprising a magnetic material from one of Nickel (Ni), Cobalt (Co), alloys of Ni, alloys of Co, or combinations thereof.

3. The method of claim 2, wherein each nanomotor of the plurality of nanomotors comprises a nanorod with a diameter of less than 10 nm and a length of less than 50 nm.

4. The method of claim 3, wherein the nanorod further comprises:
a third segment comprising Gold (Au),
wherein the second segment is placed between the first segment and the third segment.

5. The method of claim 1, wherein preparing the mesoporous silica template comprises:
forming a mixture of tetraethoxysilane (TEOS) monomer and a surfactant, the surfactant comprising cetyltrimethylammonium bromide (CTAB);
forming a hydrolyzed silica precursor within the mixture by aging the mixture under stirring at a pH value of 3; and
depositing a film of the mesoporous silica template on a graphite electrode, comprising:
immersing the graphite electrode in the mixture; and
applying a voltage between −2.5 V and −2 V to the mixture.

6. The method of claim 1, wherein forming the plurality of nanomotors within the mesoporous silica template comprises:
depositing a sacrificial layer on the mesoporous silica template within each channel of the plurality of channels, the sacrificial layer comprising a sacrificial material;
depositing a first metal layer on the sacrificial layer, the first metal layer comprising one of Platinum (Pt), Palladium (Pd), or combinations thereof; and
depositing a second metal layer on the first metal layer, the second metal layer comprising one of Nickel (Ni), Cobalt (Co), alloys of Ni, alloys of Co, or combinations thereof.

7. The method of claim 6, wherein depositing the sacrificial layer on the mesoporous silica template within each channel of the plurality of channels comprises:
immersing the mesoporous silica template in a solution of the sacrificial material;
forming a $N_2$-saturated solution of the sacrificial material by $N_2$ saturating of the solution of the sacrificial material; and applying a voltage between 0.2 V and 0.4 V to the N$_2$-saturated solution of the sacrificial material under stirring the N$_2$-saturated solution,
wherein the sacrificial material comprises one of Prussian blue (PB) (Iron hexacyanoferrate), Nickel hexacyanoferrate (NiHCF), Cobalt hexacyanoferrate (CoHCF), Copper hexacyanoferrate, or combinations thereof.

8. The method of claim 6, wherein depositing the first metal layer on the sacrificial layer comprises:
   immersing the mesoporous silica template with the sacrificial layer deposited within each channel of the plurality of channels in a first solution of a metal salt of one of Platinum (Pt), Palladium (Pd), or combinations thereof;
   forming a N$_2$-saturated first solution by N$_2$ saturating of the first solution; and
   applying a voltage between −0.5V and −0.4V to the N$_2$-saturated first solution under stirring the N$_2$-saturated first solution.

9. The method of claim 6, wherein depositing the second metal layer on the first metal layer comprises:
   immersing the mesoporous silica template with the first metal layer deposited on the sacrificial layer in a second solution of a magnetic material, the magnetic material comprising one of Nickel (Ni), Cobalt (Co), alloys of Ni, alloys of Co, or combinations thereof;
   forming a N$_2$-saturated second solution by N$_2$ saturating of the second solution; and
   applying a voltage between −1.2 V and −1 V to the N$_2$-saturated second solution.

10. The method of claim 6, wherein forming the plurality of nanomotors within the mesoporous silica template further comprises:
    depositing a third metal layer on the second metal layer, the third metal layer comprising Gold (Au).

11. The method of claim 10, wherein depositing the third metal layer on the second metal layer comprises:
    immersing the mesoporous silica template with the second metal layer deposited on the first metal layer in a third solution of Gold (Au);
    forming a N$_2$-saturated third solution by N$_2$ saturating of the third solution; and
    applying a voltage between −0.5 V and −0.4 V to the N$_2$-saturated third solution.

12. The method of claim 1, wherein separating the plurality of nanomotors from the mesoporous silica template comprises immersing the mesoporous silica template containing the plurality of nanomotors in an alkaline solution.

13. The method of claim 1, wherein separating the plurality of nanomotors from the mesoporous silica template comprises immersing the mesoporous silica template containing the plurality of nanomotors in a solution of Hydrogen Fluoride (HF).

14. The method of claim 1, wherein putting the plurality of nanomotors in contact with the contaminant solution further comprises adding an activator agent to the contaminant solution, the activator agent comprising an alkaline compound.

15. The method of claim 1, wherein putting the plurality of nanomotors in contact with the contaminant solution further comprises guiding the plurality of nanomotors by a magnetic field in the contaminant solution.

16. The method of claim 1, wherein the toxic substance comprises an organophosphate (OP) nerve agent.

17. A method for fabricating a plurality of nanomotors, the method comprising:
    preparing a mesoporous silica template, the mesoporous silica template comprising a plurality of channels, each channel of the plurality of channels with a diameter less than 50 nm and a length of less than 100 nm;
    forming the plurality of nanomotors within the plurality of channels, comprising:
      depositing a sacrificial layer on the mesoporous silica template within each channel of the plurality of channels, the sacrificial layer comprising a sacrificial material comprising one of Prussian blue (PB) (Iron hexacyanoferrate), Nickel hexacyanoferrate (NiHCF), Cobalt hexacyanoferrate (CoHCF), Copper hexacyanoferrate, or combinations thereof;
      depositing a first metal layer on the sacrificial layer within each channel of the plurality of channels, the first metal layer comprising one of Platinum (Pt), Palladium (Pd), or combinations thereof; and
      depositing a second metal layer on the first metal layer within each channel of the plurality of channels, the second metal layer comprising one of Nickel (Ni), Cobalt (Co), alloys of Ni, alloys of Co, or combinations thereof; and
    separating the plurality of nanomotors from the mesoporous silica template and the sacrificial layer.

18. The method of claim 17, wherein forming the plurality of nanomotors within the plurality of channels further comprises:
    depositing a third metal layer on the second metal layer within each channel of the plurality of channels, the third metal layer comprising Gold (Au).

19. The method of claim 17, wherein each nanomotor of the plurality of nanomotors comprises a nanorod with a diameter of less than 10 nm and a length of less than 50 nm, the nanorod comprising:
    a first segment comprising a metal, the metal comprising one of Platinum (Pt), Palladium (Pd), or combinations thereof; and
    a second segment comprising a magnetic material, the magnetic material comprising one of Nickel (Ni), Cobalt (Co), alloys of Ni, alloys of Co, or combinations thereof.

20. The method of claim 19, wherein the nanorod further comprises:
    a third segment, the third segment comprising Gold (Au), wherein the second segment is placed between the first segment and the third segment.

* * * * *